United States Patent [19]

McNaught

[11] 4,343,826
[45] Aug. 10, 1982

[54] PROCESS FOR PREPARING BEADS OF FAT

[75] Inventor: John P. McNaught, Saddle River, N.J.

[73] Assignee: Lever Brothers Company, New York, N.Y.

[21] Appl. No.: 232,499

[22] Filed: Feb. 9, 1981

[51] Int. Cl.³ .......................... A23D 5/02; A23L 1/00
[52] U.S. Cl. .................................... 426/601; 426/607; 426/609; 426/98; 426/512; 426/516
[58] Field of Search .................. 426/98, 99, 601, 607, 426/663, 515, 609, 512, 516

[56] References Cited

U.S. PATENT DOCUMENTS

| | | | |
|---|---|---|---|
| 2,785,983 | 3/1957 | McMath | 426/99 |
| 3,856,699 | 12/1974 | Miyano et al. | 426/99 X |
| 3,867,556 | 2/1975 | Darragh et al. | 426/98 |
| 3,892,880 | 7/1975 | Grolitsch | 426/607 X |
| 3,949,094 | 4/1976 | Johnson et al. | 426/99 |
| 3,973,046 | 8/1976 | Mol | 426/98 X |
| 3,973,053 | 8/1976 | Galusky | 426/601 |

Primary Examiner—Robert A. Yoncoskie
Attorney, Agent, or Firm—Irving N. Feit; James J. Farrell

[57] ABSTRACT

A process for preparing beads of fat comprising:
  (a) melting a fat at a temperature below about 175° F.;
  (b) cooling the melted fat to a temperature about 3°-8° F. below the clear point of the fat;
  (c) allowing the formation of an amount of solids sufficient to permit the fat to hold its shape when formed into drops at the temperature described in step (b);
  (d) forming the melted fat containing the solids into drops; and
  (e) cooling and collecting the drops.

8 Claims, No Drawings

PROCESS FOR PREPARING BEADS OF FAT

The present application relates to an improved process for preparing beads of fat, and more particularly to a process for preparing beads from fat which completely melts at temperatures below 175° F.

Fats such as butter and margarine are well known as flavoring for food. Occassionally, the fat is in the form of discrete particles referred to as beads, bits, chips, drops and the like.

For example, beads of butter for flavoring pancakes and similar food products are disclosed in co-assigned application Ser. No. 222,841, filed Jan. 6, 1981. The beads contain real butter and a higher melting triglyceride. Other examples of the use of fat particles in food are disclosed in U.S. Pat. Nos. 3,388,997 and 4,086,367.

Various methods have been described for making particles of fat suitable for use in food. In one such method, the fat is extruded and diced to make beads of the desired size. In another method, the fat is melted and added to a mixer containing dry ice. These and other methods, such as are described in U.S. Pat. Nos. 3,388,997 and 3,867,556, however, lead to drops which are sticky and are not free flowing. Such drops often must be coated in order to prevent agglomeration and clumping. Moreover, the prior art methods lead to drops which are not uniform in size, causing large amounts of particles that are either too large or too small and which must be reworked into beads of the proper size.

A more promising method for preparing beads of fat is the process used for making the familiar truncated cones from chocolate known as chocolate chips. Chocolate is a mixture of cocoa butter and solid matter fromm cocoa beans. According to this method, the chocolate is melted and forced into a dropping head containing nozzles. At the end of the nozzles the chocolate forms drops in the form of truncated cones. The drops fall onto a belt, are cooled and collected.

This process, however, leads to poor results when a fat rather than chocolate is used. In such cases, the fat cannot be made to form drops in the nozzles. If the fat is too fluid, it flows through the nozzles and collects in puddles on the belt on which the beads are collected. If the fat is not fluid enough, it solidifies in and clogs the nozzles. The need continues to exist, therefore, for a process capable of producing beads of fat which are not sticky and have uniform size.

SUMMARY OF THE INVENTION

It is an object of the present invention to provide a process capable of producing beads of fat that are not sticky and are uniform in size.

It is a further object of the present invention to provide a process for producing beads of fat by the same general process used in making chocolate chips.

These and other objects of the present invention as will be understood by the following description have been obtained by providing a process for preparing beads of fat comprising:

(a) melting a fat at a temperature below about 175° F.;
(b) cooling the melted fat to a temperature about 3°–8° F. below the clear point of the fat;
(c) allowing the formation of an amount of solids sufficient to permit the fat to hold its shape when formed into drops at the temperature described in step (b);
(d) forming the melted fat containing the solids into drops; and
(e) cooling and collecting the drops.

DETAILED DESCRIPTION OF THE INVENTION

In order to form commercially useful beads, a fat must be sufficiently firm to retain its shape at room temperature. In order to be sufficiently firm, the fat at room temperature should be at least 20% solid and preferably 50% as measured by NMR. The method for determining the percent solid in a fat is described in Madison et al, "Solid Fat Determination by Pulse NMR", J. Amer. Oil Chem. Soc., 55, 328 (1978).

The butter beads disclosed in co-assigned application Ser. No. 222,841 are well suited to be made by the present process. That disclosure is incorporated herein by reference.

It is preferable that the fat not be heated to a temperature at which volatile components are lost. The loss of volatile components causes the fat to lose its desirable flavor and taste. Therefore, the fat should not be heated above 200° F., preferably 175° F.

The beads can be made on the same equipment used to make chocolate chips. An example of the equipment suitable for use in the present invention is the chocolate depositor made by the National Equipment Corp. of the Bronx, New York and Chicago, Ill. The chocolate depositor contains a dropping head which is a series of nozzles through which the fat is forced by means of pistons. The fat forms drops at the end of the nozzles and the drops fall onto a belt as truncated cone-shaped heads. The beads are directed by the belt to a cooling chamber in order to promote further crystallization.

Auxilliary equipment includes a processing vessel for melting the fat. One very suitable vessel is a hemispheric kettle with centrally mounted agitators. These kettles are available from the Hamilton, Groen and Cherry Burrell Companies.

Further auxilliary equipment includes a heat exchanger. Although any suitable heat exchanger may be used, a preferred heat exchanger is a water-cooled scraped surface heat exchanger known as a thermutator.

In order to prepare the beads by the process of the present invention, fat which contains at least 20% solids at room temperature is first heated to a temperature above its melting point in a suitable vessel such as a water-jacketed kettle.

It is a preferable that the fat be completely melted before being shaped. If the fat is not completely melted, the melt cannot solidify uniformly, the composition of the beads is not homogeneous upon solidifying and the beads have a sandy feel.

The batch size is not critical. An appropriate batch size is about 500 to 3000 pounds and preferably 1000 to 1400 pounds.

After the fat has completely melted, it is cooled. It is important that the fat be cooled slowly. If the fat is cooled too rapidly, the solids that form are too hard and the mixture loses its fluidity. This results in difficulties in forming the drops and in drops that are not uniform. The lowering of the temperature is sufficiently slow if it occurs in a water-cooled kettle or heat exchanger. The heat exchanger should not be cooled by ammonia or freons.

Cooling is continued until the fat is at a temperature between about 3° and 8° F. below the clear point of the fat. The clear point is defined as the temperature at which solids are first visible when the completely melted fat is cooled.

It is preferable that solids be added to the melted fat in order to aid the crystallization process by providing seed nucleii. The solids are added either when the temperature of the melt reaches its maximum or shortly thereafter during the cooling process. The solids preferably have a composition the same as or very similar to the melt. It is desirable for economic reasons to re-use scrap solids from previous processes.

Most of the re-used bead solids melt in the kettle. The higher melting portion of the re-used solids does not melt. The unmelted solid particles aid in promoting crystallization of the melted fat.

The amount of re-used solids added is about 5 to 25% preferably 10 to 20% by weight.

When the temperature of the fat is 3° to 8° F. below the clear point, a waiting period begins. During the waiting period, an amount of solid is allowed to form. The amount of solid is that sufficient to permit the fat to retain its shape when it forms a drop at the end of the nozzle of the dropping equipment. The amount is best determined by trial and error. One helpful guideline is that when the correct amount of solid is present, the fat changes from being almost clear or slightly translucent to being very translucent or nearly opaque. It is believed that the amount of solid that will permit the fat drop to retain its shape is about 5 to 15% of the weight of the drop.

The waiting period may be as short as three minutes or as long as fifteen minutes, preferably five to ten minutes. It is critical that the waiting period be long enough to permit sufficient solids to form in the melt.

When the proper amount of solids has formed, the mixture is directed to the dropping head where it is formed into drops at the end of the nozzles. The drops fall onto a belt, are cooled and collected. The beads of fat may be coated in order to prevent agglomeration, but when made by the process of the present invention, coating is not necessary. Suitable coatings include confectioners sugar and flour.

The butter beads may also contain other ingredients, if desirable. Thus, common colorants and preservatives, if necessary, may be added. Suitable coloring agents include β-carotene, annatto, carrot oil, corn gluten and the like. Suitable preservatives include tertiary butyl hydroquinone, sodium benzoate, potassium sorbate and the like.

The shape of the drops should be that of a truncated cone, although depending upon conditions such as temperature and the amount of time the drops spend in the nozzle, the drops may also be spherical. The size of the beads is not critical. Commercially useful beads may be formed that are as small as 3 millimeters in diameter or as large as 25 millimeters or even higher. The size of the beads is determined mainly by the size of the nozzles in the dropping head.

When making beads according to the present process, the dropping head is preferably made from stainless steel due to its inertness and resistance to corrosion. Brass is to be avoided because of the tendency of brass to oxidize fat. Such oxidation causes the fat to become rancid and acquire a poor taste.

The present process is virtually the same as that used to make chocolate chips. When making chocolate chips, however, it is not necessary to hold the temperature of the melted fat 3°-8° F. below the clear point of the fat in order to permit solids to form. It is theorized that chocolate contains in addition to fat various solids that do not readily melt. Therefore, when the heated chocolate is cooled, sufficient solids are already present to permit drop formation.

Fats such as butter and margarine, on the other hand, melt to an essentially clear state, although some milk solids are present. These milk solids, however, are not sufficient to permit the formation of drops according to the present process. Upon cooling the melted butter or margarine, therefore, it is necessary to precipitate sufficient solids in order to form drops which retain their shape.

Having generally described the invention, a more complete understanding can be obtained by reference to certain specific examples, which are provided herein for purposes of illustration only and are not intended to limit the invention unless otherwise specified.

EXAMPLE I

A fat bead is produced which contains 66.4% KLX flakes supplied by the Durkee Industrial Foods Group of SCM Corp., 33.6% dehydrated butter and 0.0009% beta-carotene.

KLX flakes are derived from hydrogenated soybean and cottonseed oils and are formed into flakes with a chill roll. The dilatation values of KLX flakes are as follows:

| Temperature (°C.) | Dilatation Values | % Solids as determined by NMR |
| --- | --- | --- |
| 0 | 1800–2000 | 96 |
| 20 | 1800–2000 | 95 |
| 36 | 1600–1800 | 70 |
| 42 | 1400–1600 | 45 |

Two 200 gallon Hamilton kettles equipped with scraper blade agitators and a second counter revolving agitator are used for batch blending. The fat size is 1000 to 1400 pounds. The butter is allowed to stand over night at room temperature or slightly above (i.e., 70°–90° F.). The KLX flakes are added to the kettles and melted. The pre-softened butter and a mixture of the beta-carotene and about 100 grams of KLX flakes are added to the melted KLX flakes in the kettle. The mixture is heated to 165° to 170° F. and then cooled to 130° to 135° F. At this temperature, approximately 100 to 200 lbs. of beads made in a previous process are added to the blend. The re-used beads substantially melt although some solids remain as an aid in crystallizing the melted fat. When most of the re-used beads have melted, the blend in the kettle is further cooled. At a temperature of 110° to 115° F., solids begin to form. The batch is held at this temperature until it is judged that sufficient solids have formed to permit proper bead formation.

The batch is then pumped through a thermutator in order further to lower the temperature of the melt to 107° to 109° F. and to assure a uniform temperature. The mixture next passes to a feed hopper and then to a stainless steel dropping head having special external heat tracer tapes to unclog the nozzles. The beads form at the end of the nozzles and drop onto a 75 foot belt which leads the beads to a cooling tunnel. The cooled beads are removed from the belt by a scraper bar, screened, and placed into bags. The packed beads are transferred promptly to a cooled area for storage at between 40° to 50° F. in order to avoid clumping.

Having now fully described the invention, it will be apparent that many changes and modifications can be made thereto without departing from the spirit or scope of the invention as set forth herein.

What is claimed is:

1. A non-spray process for preparing solidified beads of fat comprising:
   (a) melting a fat which contains at least 20% solids at room temperature at a temperature below about 175° F.;
   (b) cooling the melted fat to a temperature about 3°–8° F. below the clear point of the fat;
   (c) allowing the formation of an amount of solids sufficient to permit the fat to hold its shape when formed into drops at least 3 mm in diameter at the temperature described in step (b);
   (d) forming the melted fat containing the solids into drops having a diameter of at least 3 mm; and
   (e) cooling and collecting the solidified drops.

2. A process of claim 1 wherein the drops are in the form of truncated cones.

3. The process of claim 1 wherein the melted fat is nearly opaque before being formed into drops.

4. The process according to claim 1 wherein solids are added to the melt before the melt reaches the temperature of 3° to 8° F. below the clear point of the fat in order to aid crystallization.

5. The process according to claim 1 wherein the fat contains butter or margarine.

6. The process according to claim 1 wherein the fat contains butter.

7. The process according to claim 6 wherein the butter is dehydrated.

8. The process according to claim 7 wherein the fat further contains a higher melting triglyceride.

* * * * *